US008730087B2

(12) United States Patent
Filippi et al.

(10) Patent No.: US 8,730,087 B2
(45) Date of Patent: May 20, 2014

(54) PASSIVE RADAR FOR PRESENCE AND MOTION DETECTION

(75) Inventors: Alessio Filippi, Eindhoven (NL); Biju Kumar Sreedharan Nair, Delft (NL); Willem Franke Pasveer, Dordrecht (NL); Teun Martinus Johannes van Berkel, Veghel (NL)

(73) Assignee: Koninklijke Philips N.V., Eindhoven (NL)

( * ) Notice: Subject to any disclaimer, the term of this patent is extended or adjusted under 35 U.S.C. 154(b) by 549 days.

(21) Appl. No.: 12/937,401

(22) PCT Filed: Apr. 9, 2009

(86) PCT No.: PCT/IB2009/051516
§ 371 (c)(1),
(2), (4) Date: Jan. 27, 2011

(87) PCT Pub. No.: WO2009/128002
PCT Pub. Date: Oct. 22, 2009

(65) Prior Publication Data
US 2011/0148689 A1 Jun. 23, 2011

Related U.S. Application Data

(60) Provisional application No. 61/045,296, filed on Apr. 16, 2008.

(51) Int. Cl.
*G01S 13/00* (2006.01)
(52) U.S. Cl.
USPC .............................................. 342/28; 342/27

(58) Field of Classification Search
USPC ...................................................... 342/27–28
See application file for complete search history.

(56) References Cited

U.S. PATENT DOCUMENTS

2004/0246177 A1  12/2004  Lloyd et al.
2005/0285787 A1  12/2005  Delaveau et al.
(Continued)

FOREIGN PATENT DOCUMENTS

GB  2378335 A  5/2003
JP  2006014027 A  1/2006
WO  2006067436 A1  6/2006

OTHER PUBLICATIONS

Masahiro Nishi et al, "Indoor Human Detection Systems Using VHF-FM and UHF-TV Broadcasting Waves" The 17th Annual IEEE International Symposium on Personal, Indoor and Mobile Radio Communications, Sep. 1, 2006, 5 pages.

Danny Kai Pin Tan et al, "GSM Based Through-the-Wall Passive Radar Demonstrator for Motion Sensing", New Trends for Environmental Monitoring Using Passive Systems, Oct. 17, 2008, 4 pages.

(Continued)

*Primary Examiner* — Timothy A Brainard

(57) ABSTRACT

A passive detector (10) includes a receiver (11) configured to collect passive radiation (12) in an environment, where detailed information about a portion of the passive radiation is estimated as a baseline of the passive energy. The passive energy is generated by a passive source unrelated to the detector. A monitor (24) is configured to measure a fluctuation in the baseline. A decision module (34) is coupled to the monitor to determine whether the fluctuation represents a presence or motion in the environment. Detection methods are also disclosed.

17 Claims, 5 Drawing Sheets

(56) References Cited

U.S. PATENT DOCUMENTS

| | | | |
|---|---|---|---|
| 2006/0208881 A1* | 9/2006 | Suzuki | 340/539.27 |
| 2006/0250279 A1* | 11/2006 | Taniguchi et al. | 340/933 |
| 2008/0001734 A1* | 1/2008 | Stilp et al. | 340/539.22 |
| 2009/0023475 A1* | 1/2009 | Chang et al. | 455/557 |
| 2009/0059893 A1* | 3/2009 | Jou | 370/350 |
| 2009/0067448 A1* | 3/2009 | Stanwood et al. | 370/447 |
| 2009/0154726 A1* | 6/2009 | Taenzer | 381/94.1 |
| 2010/0296368 A1 | 11/2010 | Dahl et al. | |

OTHER PUBLICATIONS

Danny K.P. Tan et al, "Feasibility Analysis of GSM Signal for Passive Radar", Proceedings of the 2003 IEEE Radar Conference, May 5-8, 2003, pp. 425-430.

D.K.P. Tan et al, "Passive Radar Using Global System for Mobile Communication Signal: Theory, Implementation and Measurements", IEEE Proceedings: Radar, Sonar & Navigation, Institution of Electrical Engineers, vol. 152, No. 3, Jun. 3, 2005, pp. 116-123.

* cited by examiner ations in the passive radiation of the best channel; and determining whether the fluctuations represent a presence or motion in the environment.

These and other objects, features and advantages of the present disclosure will become apparent from the following detailed description of illustrative embodiments thereof, which is to be read in connection with the accompanying drawings.

This disclosure will present in detail the following description of preferred embodiments with reference to the following figures wherein.

Figure 1:
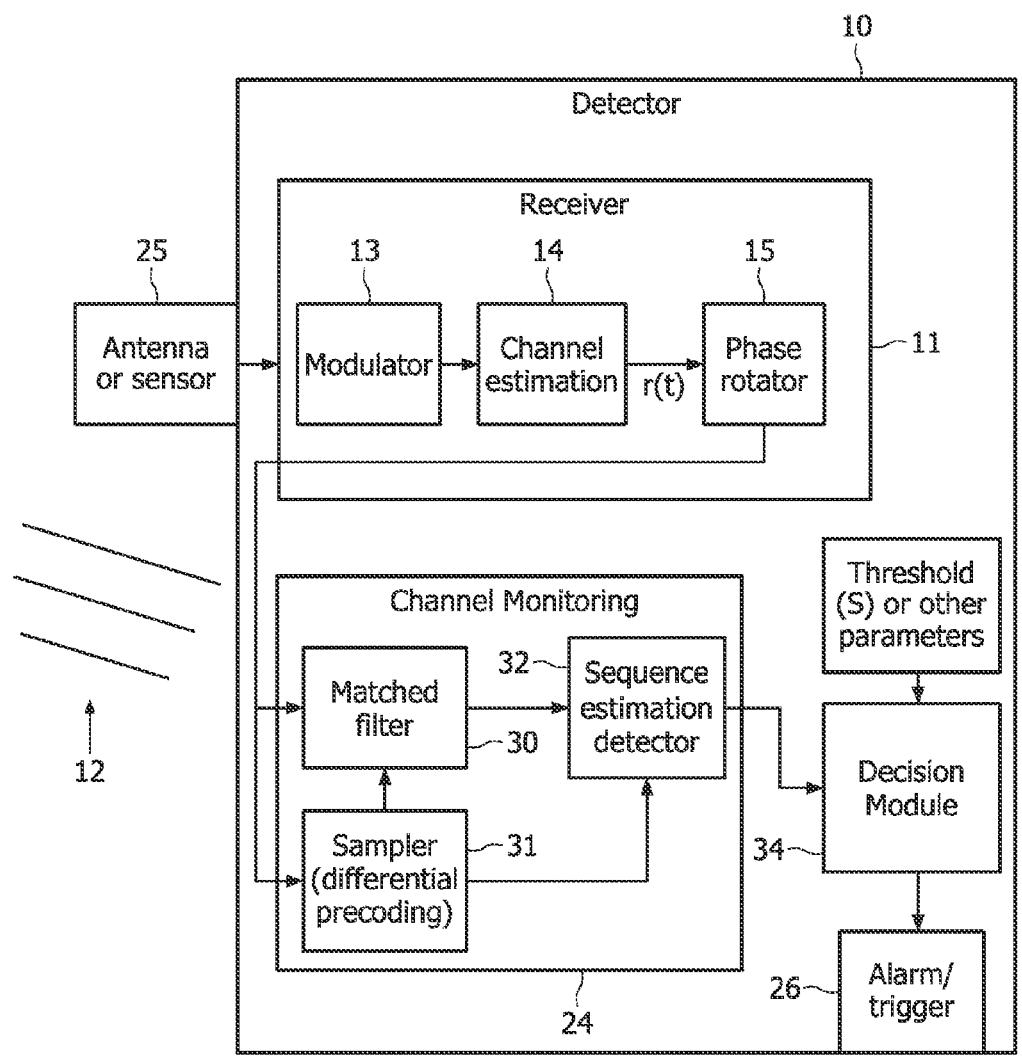
FIG. 1 is a block diagram showing an illustrative passive radar detector or motion/presence sensor in accordance with an illustrative embodiment.

The present disclosure describes systems and methods for detecting indoor motion of an object and, in particular, of a human being without radiating any power. Detailed knowledge of the radio signals already in the air is employed to characterize the way the signals change over time. By doing so, human presence and/or motion is able to be distinguished in an environment.

It should be understood that the present invention will be described in terms of motion sensing; however, the teachings of the present invention are much broader and are applicable to any components that may be detected by altering a local electromagnetic signal. Embodiments described herein are preferably employed in security or other detection systems, but may be employed in photography applications or any other applications where motion sensing or a living presence needs to be detected. Sensors or detectors as described herein may be implemented using semiconductor devices, software, printed wiring boards and any other electronic equipment. It should be understood that the illustrative examples of the detectors may be adapted to include additional electronic components, such as alarms, lights or storage devices and media. These components may be formed integrally with the detectors or may be separately employed.

The elements depicted in the FIGS. may be implemented in various combinations of hardware and software and provide functions which may be combined in a single element or multiple elements.

An apparatus and method for detecting motion of an object, in particular, indoor motion of a human being, uses a detailed knowledge of radio signals already in the air (e.g., passive radar) to characterize the way the signals vary over time. Present embodiments make it possible to distinguish between indoor and outdoor movement. Detecting the human presence/movement is done by exploiting the structure of the RF signal. Radiating power to use for detection is not required.

The basic elements of a conventional RF receiver, e.g., a Global System for Mobile Communications (GSM) receiver, may be used to synchronize with respect to a signal and perform channel estimation. The estimated channel is then used to find a more robust way of observing when motion occurs in the indoor environment. The present invention makes possible an indoor motion detector employing existing GSM or other signals, but using only a few elements of a conventional communication system. As compared to a conventional receiver, the needed complexity is very limited since we only need a few elements of the conventional physical layer of the communication system. In one application, the use of communication system hardware permits the usage of a motion sensing application in a telephone or equivalent device.

Following the same principle, other radio signals might be used to detect the human presence. Other methods different from those described herein may also be employed and used to improve the precision. Since the present invention employs passive detection, it would be less "energy hungry" compared to active systems and could be employed for energy management applications or security applications. Also, other applications involving presence detection may be used in applications like, for example, garden lighting, appliance activation/deactivation and the like.

Referring now to the drawings in which like numerals represent the same or similar elements and initially to FIG. 1, a passive motion/presence detector or passive radar detector 10 is shown in accordance with one embodiment. Detector 10 includes a sensor or antenna 25 capable of receiving ambient radiation 12 in a room or environment. The ambient radiation may include radio frequency radiation or other types of radiation that may be present. In one embodiment, wireless communication radiation (e.g., code division multiple access (CDMA), time division multiple access (TDMA), such as GSM) or other packetized or modulated signals may be employed. In one example, a security system or other device present at or near a particular location may emanate radiation that may be employed to detect presence or motion at a location. In such an embodiment, the nearby device may be employed to provide energy employed to passively detect motion or presence. It would be preferable if the energy emanating from the nearby device were periodic and/or provide a predictable pulse or constant energy for a known duration.

The GSM standard defines broadcast channels that are always transmitted and present in a service area. For efficiency, the present embodiments will be described using GSM signals/radiation. The present principles should not be construed as limited by this example, however. GSM signals provide a preferred example since GSM signals, where employed as a part of a cellular network enter buildings, partially bounce off or can be partially absorbed by people. Therefore, the GSM signals can change with the motion or mere presence of a person in an environment.

GSM signals include a fixed known sequence called a mid-amble although other portions of the signal may also be employed. The device 10 receives the GSM signals and finds the mid-amble of the signal. In the illustrative embodiment, device 10 includes a GSM receiver 11 having, e.g., a Gaussian minimum shift keying (GMSK) modulator 13. The received signal may be differentially precoded, demodulated by modulator 13 and phase rotated by a phase rotator 15.

The mid-amble includes a pilot signal which can be employed to estimate a strongest channel in the signal by employing a channel estimation module 14. Once the estimated channel is found, the channel can be monitored for changes by a channel monitoring module 24. Channel monitoring module 24 monitors the status of the incoming signal and provides input to a decision module 34. Decision module 34 may include a threshold (S) which may be derived by computing the channel strength at a given time and comparing a current value of the channel strength to the threshold. If the threshold is exceeded, motion is detected or the presence of a human has been detected. The decision module 34 then outputs and alarm or trigger signal 26 that may be employed to indicate one of the presence or motion in the monitored environment. Further details of a preferred embodiment will now be described in accordance with the present principles.

Figure 2:
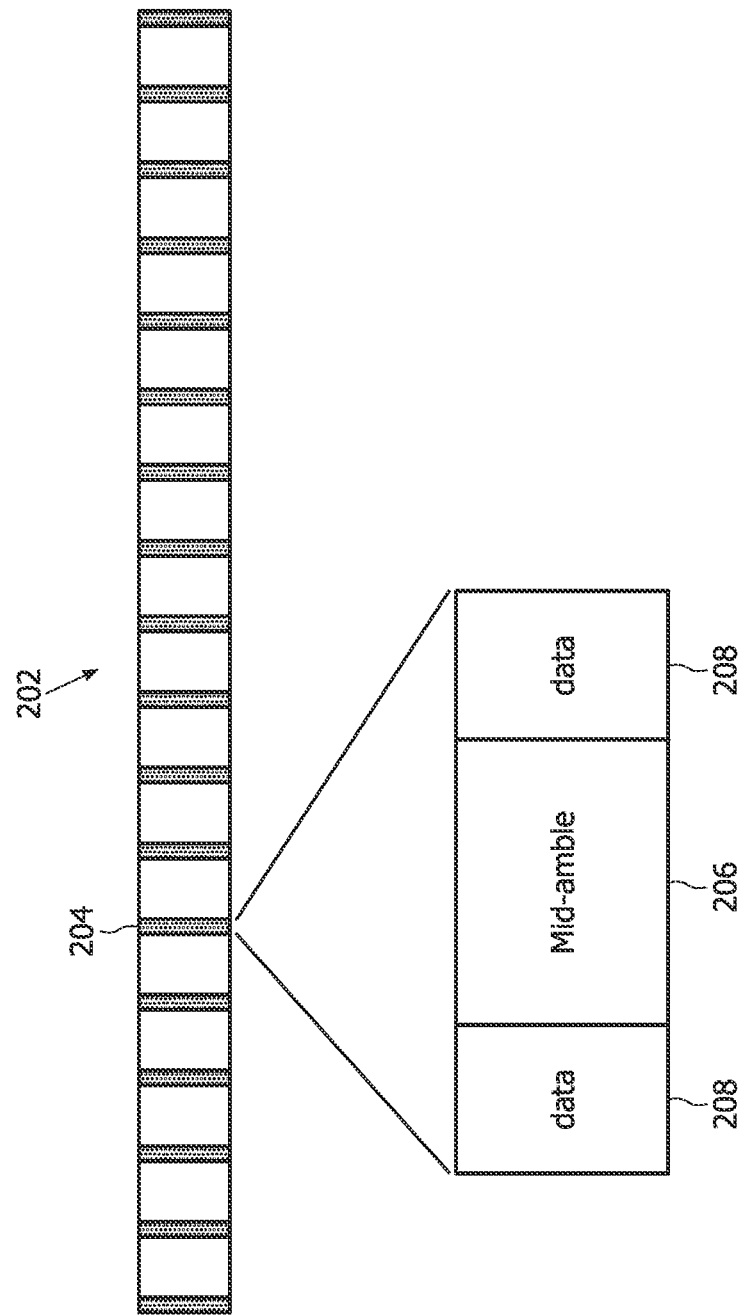
FIG. 2 is a diagram showing an illustrative passive energy source which includes a GSM frame and a magnified portion showing a mid-amble.

Referring to FIG. 2, in the GSM example, a GSM broadcast packet frame 202 includes a synchronization channel (SCH) 204. The synchronization channel 204 forms a mid-amble 206 which is sandwiched between data 208 in the GSM frame 202. The Global System for Mobile Communications (GSM) standard is currently the most successful of all digital cellular standards. GSM provides transmission of digitalized speech and data using a Time Division Multiple Access (TDMA) scheme. Each TDMA frame is divided into eight time slots where each slot serves one user. Each time slot provides room for a burst which includes data as well as a training sequence used to estimate the channel impulse response. There is a 64-bit training sequence at the center of each synchronization burst, with a 39-bit encrypted data sequence (208) on each side of the mid-amble or the training signal 206. The data 208 is transmitted using (GMSK) with normalized bandwidth, e.g., BT=0.3, where B is the bandwidth and T is the symbol duration.

The disadvantage of GMSK is that it increases the effect of Inter Symbol Interference (ISI) due to its differential modulation scheme. A low side-lobe level and constant modulus are the two main advantages of using GMSK in wireless communication systems. GMSK deliberately introduces controlled ISI to improve spectral efficiency.

A received signal r sampled at the symbol rate m may be expressed as:

$$r(m) = \sum_{n=1}^{N_h} h(n)p(m-n) + \eta(m) \quad (1)$$

where m is the received symbol index, n is the channel path index, $N_h$ is the number of channel taps of the complex overall channel impulse response h(n), p(m) is the pilot signal sequence carried within the mid-amble 206 and η(m) is the noise term.

Referring again to FIG. 1, in one embodiment, we may use the in-phase (I) component and ignore the quadrature (Q) component and subsequently process only the real part of the received signal, treating it as a bi-phase shift keying (BPSK)-type signal. The detector 10 can therefore be real and, thus, computationally much simpler than its complex counterpart. This type of receiver is referred to as a serial receiver, as opposed to a parallel receiver. Since the coherence times of the mobile radio channels encountered by the GSM system typically are much greater than the duration of a TDMA time slot, these channels can be characterized as slowly time-varying. We follow the usual approach to GSM receiver design in this case, which is to consider the channel as fixed during the burst period and, consequently, compute the channel estimate only once per burst. An estimation is performed by cross correlating the middle part (mid-amble) of the received burst (after phase rotation) with the original sequence. The position of the correlation peak is utilized for burst synchronization.

The channel estimate is utilized by the various data detector schemes, as well as by a matched filter 30. An optimal receiver for the system includes a continuous-time filter 30 matched to the overall channel, followed by a symbol-space sampler 31 and a Maximum Likelihood Sequence Estimation (MLSE) detector 32. However, a discrete-time matched filter 30 may be adaptively set up once per burst, with an impulse response which is the time-reversed complex conjugate of $\{h_n\}$. The combination of phase rotation and matched filtering performed on the received signal produces an output whose real component is used for estimating the data sequence $\{d_n\}$.

Within the synchronization channel, a packet is broadcast by the base station to the mobile terminals. Before a packet arrives at a mobile terminal it is reflected by objects surrounding the path. These contributions to the received signal of a packet accumulate, and therefore, the communication channel will change over time, at least if these contributions change over time. Two methods of detecting motion may be employed. The first includes a Doppler effect, while the second focuses on deviations in the channel energy over time. A decision module 34 is employed to determine motion or presence.

The Doppler effect is the change in frequency of a wave as perceived by an observer moving relative to the source of the waves. For waves that propagate, the velocity of the observer and of the source are relative to the medium in which the waves are transmitted. The total Doppler effect may therefore result from motion of the source, motion of the observer, but also motion of wave reflected objects. For detecting a Doppler effect we will correlate the channel estimate with its delayed version. Therefore, we first need an accurate estimate of the channel.

In the GSM system each synchronization burst transmitted by a base station includes the "mid-amble" (206) including a 64 bit training sequence. These training sequences, are used by the mobile station to calculate channel taps needed for demodulation of data within each timeslot transmitted from the GSM base station. The ability of the demodulator to reconstruct error free data may be limited by the quality of the channel estimation. The mobile station uses each training sequence to locate the center of the signal burst containing it. It does this by comparing the part of the burst where the training sequence is expected to be with a locally generated sequence which matches the expected training sequence. In conventional channel estimation devices, the central bits of the training sequence are correlated with the expected sequence and the result is used to estimate the timing error so that the channel taps can be set accordingly. It should be understood that other signals, preferably with known or expected characteristics may be employed. Such signals may be monitored in the background and learned by the detector over a period of time.

An estimated channel (14) may be determined using the following equation:

$$\hat{h}_l = \frac{1}{N_p} \sum_{n=1}^{N_p} p^*(n) r(l+n) \quad (2)$$

where r(l) is the received signal, n is the mid-amble sequence index, $N_p$ is the length of the mid-amble sequence, $p^*(n)$ is the mid-amble training sequence and l is the channel path index. Here, p is the phase corrected training sequence, $d_n j^n$, and $N_p$ is the length of the training sequence.

To visualize a frequency change in the channel estimate, i.e., a Doppler effect, we correlate the main path of the channel with its delayed version:

$$chh(l) = \sum_{m=0}^{M_p} \hat{h}_0(l) \hat{h}_0^*(l-m).$$

Here, $\hat{h}_0(l)$ is the main path of the channel of packet l, $M_p$ is the number of delayed packets, $\hat{h}_0^*(l-m)$ is the main path of the channel packet, l−m, and chh(−) is the correlation coefficient. The expected value for the correlation coefficient indicates whether motion is detected. A sudden drop, over time, indicates low correlation and thus a phase drift within the estimated channel.

The fluctuation of the instantaneous received energy of the main paths of a channel over time may also be employed to detect motion. Again, we use the same channel estimation method as explained previously. We define the energy of the channel as:

$$|\bar{h}_0(k)|^2 = \sum_{n=-2}^{1} |\bar{h}_{0+n}(k)|^2.$$

Several options exist to model the channel energy deviation over time. We will focus on the standard deviation of the energy. Therefore, we introduce a decision variable. If the decision variable exceeds a certain threshold, we claim that motion is detected.

Figure 3:
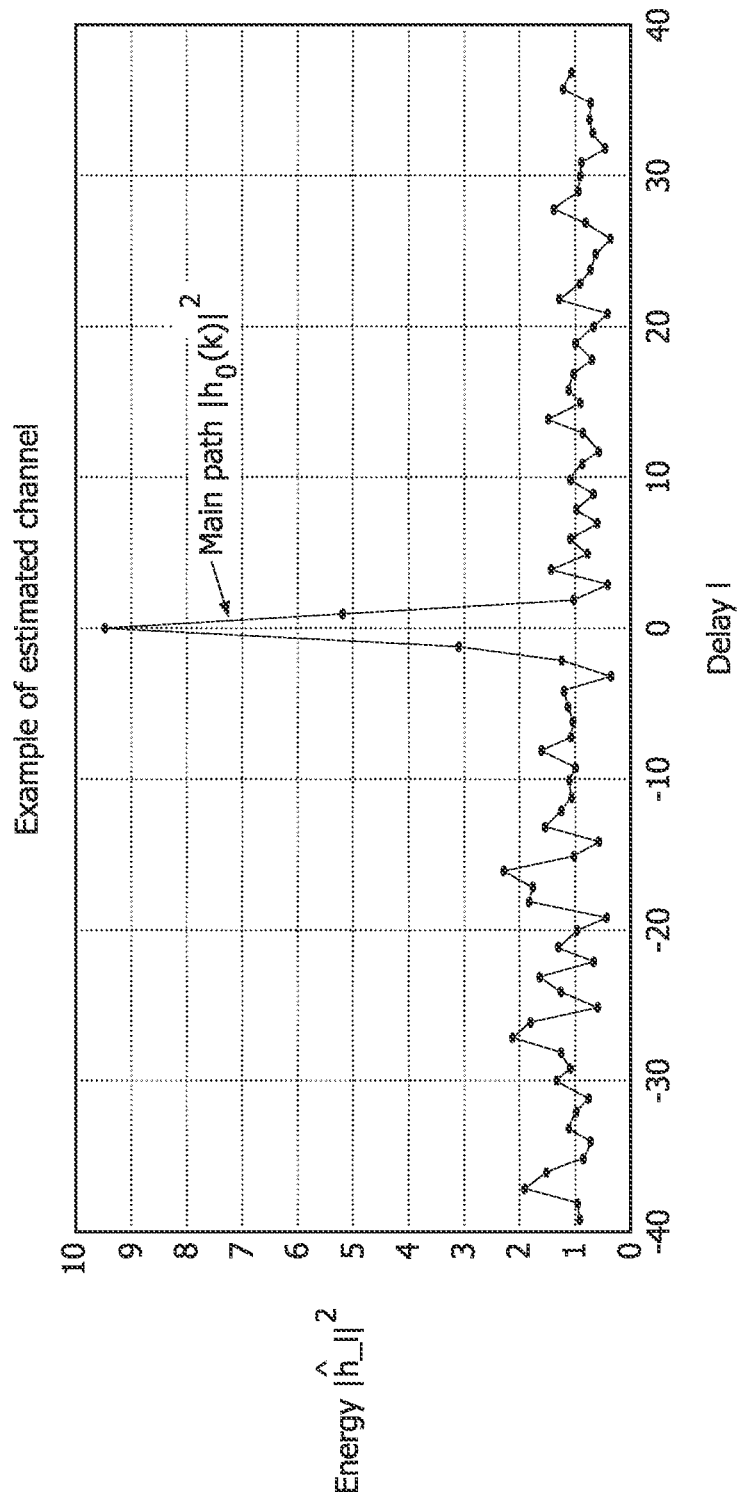
FIG. 3 is a plot of energy versus delay to demonstrate one illustrative method for selecting a best path or channel as a baseline in accordance with the present principles.

Referring to FIG. 3, an example, of channel estimation is illustratively depicted. FIG. 3 plots the magnitude of the channel energy ($|\hat{h}_l|^2$) versus delay l. By plotting the estimated channel energies a main path of channels can be determined. The main path $|h_0(k)|^2$ of broadcast packet k (202) provides the path with the strongest energy $|h_0(k)|^2$. The channel energy around the main path of the broadcast packet k can be expressed as:

$$|\bar{h}_0(k)|^2 = \frac{1}{4} \sum_{n=-2}^{1} |\bar{h}_{0+n}(k)|^2. \quad (3)$$

Using this energy profile a decision variable can be derived to measure the fluctuations in the energy profile. The decision variable may be derived or customized for different changes in the energy profile such as shifts in amplitude, shifts in phase, changes in frequency or any other parameter change. Each change may be representative of different environment changes or conditions.

In one embodiment, the decision variable, ⑨, includes the following:

$$\sigma^2_{|\bar{h}_0|^2}(k) = \frac{1}{L} \sum_{l=1}^{L} \left( |\bar{h}_0(k+l)|^2 - \frac{1}{L'} \sum_{l=1}^{L'} |\bar{h}_0(k+l)|^2 \right)^2 \quad (4)$$

where the standard variation of the random variable (r.v.) $|\bar{h}_0(k+l)|^2$ is estimated. The term $$\frac{1}{L'} \sum_{l=1}^{L'} |\bar{h}_0(k+l)|^2$$

represents an estimate of the average value of the energy of the channel, i.e. the r.v. $|\bar{h}_0(k+l)|^2$, L' is the number of observations of the r.v. $|\bar{h}_0(k+l)|^2$ used to derive its average value, L is the number of observations of the r.v. $|\bar{h}_0(k+l)|^2$ used to estimate the standard variation of the r.v. and l is the index of the r.v. L and L' might be equal.

It should be understood that other decision functions/variables may be employed and may employed other power distributions functions. Such functions and distributions may be more sensitive to specific aspects to the energy or radiation present in an environment as such variations may be employed to optimize a particular application or to provide additional sensitivity.

Figure 4:
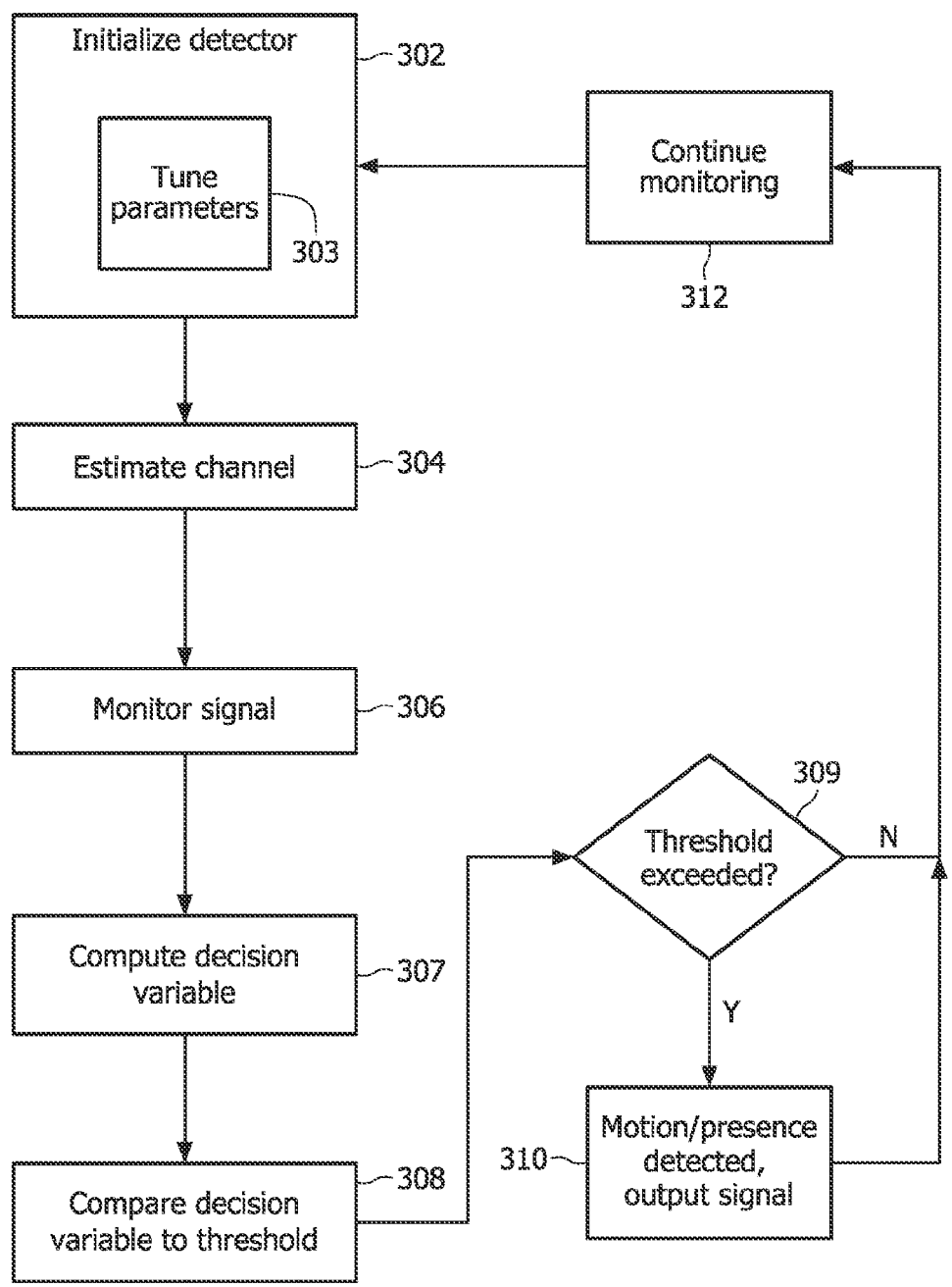
FIG. 4 is a block/flow diagram showing a system/method for detecting presence or motion in accordance with an illustrative embodiment.

Referring to FIG. 4, a block/flow diagram for monitoring an environment for motion detection or a living presence is illustratively depicted. In block 302, a detector in accordance with the present principles is initialized. This may include synchronization for a local GSM or other wireless base station. For example, a mid-amble of a GSM broadcast packet may be employed as a reference. In other embodiments, synchronization may be made or a baseline of ambient radiation may be collected to provide a reference or baseline for the method. The initialization may include tuning parameters or variables (e.g., for sensitivity, etc.) in accordance with the desired application, in block 303. For example, the averaging window (L) and the threshold (S) can be tuned to provide different sensitivity or to search for different characteristics. More advanced variables may also be employed and tuned. For example, a Doppler spectrum or channel coherence time may be monitored and employed.

In block 304, channel estimation is performed to determine a preferred channel or source of energy to be monitored. In block 306, monitor the signal over time. In block 307, a decision variable is computed from estimated or measured for updated information about the monitored signal. In block 308, a comparison is made between a threshold value and the computed decision variable. If the decision variable is greater than (or less than, depending on the methodology selected) the threshold in block 309, presence or motion is detected in the monitored area in block 310.

An output signal is generated in block 312. The signal may trigger a device, provide an alert or alarm or may simply log in the change in a storage device, such as a computer or the like. Such signals may be employed for tracking a person or object or gaining information about the density of people in an area.

Otherwise, in block 312, there is no motion or presence in the area. The monitoring process is continued, and the program path returns to possibly reinitialize, monitor or recalculate the decision variable based upon updates in the signal being monitored or default settings or logic.

Figure 5:
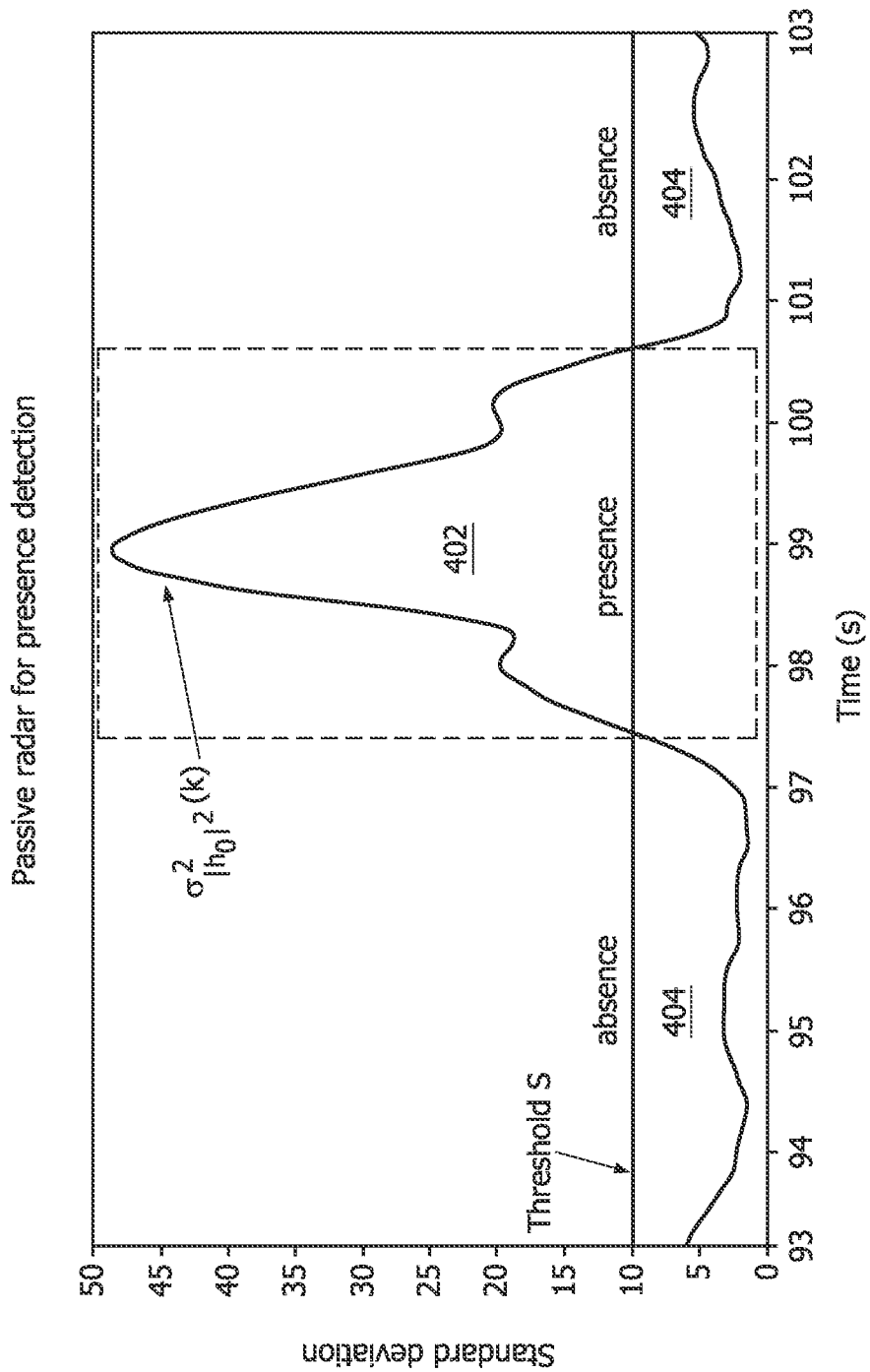
FIG. 5 is a plot showing a comparison between a decision variable and a threshold to determine presence or motion in accordance with an illustrative embodiment.

Referring to FIG. 5, a plot of the decision variable (⑨) which represents a standard deviation/variation of a signal being monitored versus time (seconds) is illustratively depicted. A threshold (S) is shown which indicates a position above which it has been determined represents the presence of a person or living thing in a monitored environment. Below the threshold, regions 404 represent the status quo or the absence of motion or the presence of a human or living thing in the environment. As indicated, in region 402, the decision variable or function $$\sigma \frac{2}{|h_0|^2}(k)$$

has a local maximum (k is a time index).

The present embodiments provide a passive and inexpensive presence detection system. The present embodiments are useful in security applications, and in lighting applications (turn on and off lights or other devices in accordance with presence). The present principles provide for a reduction in energy needed to perform operations since the signals used are already in the air as opposed to having to generate these signals.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) no specific sequence of acts is intended to be required unless specifically indicated.

Having described preferred embodiments for systems and methods for passive radar for presence and motion detection (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the embodiments disclosed herein as outlined by the appended claims. Having thus described the details and particularity required by the patent laws, what is claimed and desired protected by Letters Patent is set forth in the appended claims.

The invention claimed is:

1. A passive detector, comprising:
   a receiver configured to collect passive radiation in an environment, where detailed information about a portion of the passive radiation is used to determine a baseline energy of passive energy generated by a passive source comprising a multi-channel wireless communications network signal unrelated to the detector;
   a channel estimation module configured to estimate a strongest channel to be monitored in the baseline energy of the multi-channel wireless communications network signal;
   a monitor configured to measure a fluctuation in the baseline energy of the strongest channel; and
   a decision module coupled to the monitor to determine whether the fluctuations in the estimated strongest channel represent a presence or motion in the environment in reliance on a comparison of a computed decision variable to a threshold to determine if statistical fluctuations measured in said baseline energy of the strongest channel represent said presence of motion,
   wherein the passive detector estimates the channel energy deviation of said estimated strongest channel over time.

2. The detector as recited in claim 1, wherein the portion of the passive energy includes a mid-amble of a Global System for Mobile Communications (GSM) standard wireless communications network signal.

3. The detector as recited in claim 1, wherein the decision module compares the decision variable to a threshold to determine if the fluctuation represents motion or a presence in the environment.

4. The detector as recited in claim 1, wherein the decision module outputs a signal in accordance with a detected presence or motion.

5. The detector as recited in claim 1, wherein the passive energy is collected from a nearby energy source unrelated to the detector.

6. The detector as recited in claim 1, wherein the fluctuation is employed to measure the Doppler effect.

7. A passive motion detector, comprising:
   a receiver configured to collect a wireless communications signal from an environment and estimate a baseline energy from an expected or periodic portion of the wireless communication signal, the baseline energy being generated by a passive source comprising a multi-channel wireless communications network signal unrelated to the detector, the receiver including a channel estimation module configured to estimate a strongest channel to be monitored in the baseline energy;

a channel estimation monitor configured to measure statistical fluctuations in the baseline energy of the strongest channel; and a decision module coupled to the monitor and configured to determine whether the fluctuations in the estimated strongest channel represent a presence or motion in the environment in reliance on a comparison of a computed decision variable to a threshold to determine if statistical fluctuations measured in said baseline energy of the strongest channel represent said presence of motion.

8. The detector as recited in claim 7, wherein the wireless communications signal includes a Global System for Mobile Communications (GSM) standard wireless communications network signal.

9. The detector as recited in claim 7, wherein the expected or periodic portion of the communications signal includes a mid-amble of the GSM signal.

10. The detector as recited in claim 7, wherein the decision module outputs a signal in accordance with a detected presence or motion.

11. The detector as recited in claim 7, wherein the expected or periodic portion of the communications signal is collected from a base station.

12. A method for determining presence or motion in an environment in a passive detector, the method comprising:

estimating, by a channel estimator, a strongest channel from existing passive radiation in an environment wherein the passive radiation is generated by an unrelated passive source comprising a multi-channel wireless communication network signal;

monitoring, by a decision module, fluctuations in the passive radiation of the strongest channel of a multi-channel wireless communication network signal; and determining, by the decision module, whether the fluctuations represent a presence or motion in the environment, and wherein said determination is made in accordance with a decision variable which is computed based upon a statistical fluctuation in an energy deviation in said strongest channel of said multi-channel wireless communication network signal.

13. The method as recited in claim 12, wherein the passive energy includes a mid-amble of a Global System for Mobile Communications (GSM) standard wireless communications network signal.

14. The method as recited in claim 12, further comprising comparing the decision variable to a threshold to determine if the fluctuation represents motion or a presence in the environment.

15. The method as recited in claim 14, further comprising adjusting detection sensitivity by adjusting the threshold.

16. The method as recited in claim 12, further comprising outputting a signal in accordance with a detected presence or motion.

17. The method as recited in claim 12, wherein the fluctuations are employed to measure the Doppler effect.

* * * * *